US012583172B2

(12) United States Patent
Cho et al.

(10) Patent No.: US 12,583,172 B2
(45) Date of Patent: Mar. 24, 2026

(54) ARTIFICIAL SCALP MODEL PRODUCTION METHOD USING 3D PRINTING-BASED MULTI-POINT MULTI-NOZZLES AND ARTIFICIAL SCALP MODEL CREATED BY USING SAME

(71) Applicants: POSTECH Research and Business Development Foundation, Pohang-si (KR); PUSAN NATIONAL UNIVERSITY INDUSTRY—UNIVERSITY COOPERATION FOUNDATION, Busan (KR)

(72) Inventors: Dong-Woo Cho, Nam-gu (KR); Byoung Soo Kim, Yangsan-si (KR); Won-Woo Cho, Nam-gu (KR); Min Jun Ahn, Nam-gu (KR)

(73) Assignees: POSTECH Research and Business Development Foundation, Pohang-si (KR); PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 106 days.

(21) Appl. No.: 18/834,811

(22) PCT Filed: Jan. 4, 2023

(86) PCT No.: PCT/KR2023/000152
§ 371 (c)(1),
(2) Date: Jul. 31, 2024

(87) PCT Pub. No.: WO2023/167402
PCT Pub. Date: Sep. 7, 2023

(65) Prior Publication Data
US 2025/0108555 A1 Apr. 3, 2025

(30) Foreign Application Priority Data

Mar. 2, 2022 (KR) ........................ 10-2022-0026918

(51) Int. Cl.
*B29C 64/209* (2017.01)
*B29C 64/106* (2017.01)
(Continued)

(52) U.S. Cl.
CPC .......... *B29C 64/106* (2017.08); *B29C 64/209* (2017.08); *B29C 64/264* (2017.08);
(Continued)

(58) Field of Classification Search
CPC .... B29C 64/106; B29C 64/112; B29C 64/209
See application file for complete search history.

(56) References Cited

U.S. PATENT DOCUMENTS

| | | | | | |
|---|---|---|---|---|---|
| 2018/0105781 A1* | 4/2018 | Ou | ........................... | A61L 27/52 |
| 2019/0275208 A1* | 9/2019 | Bozek | .................... | A61K 35/36 |
| 2020/0283736 A1* | 9/2020 | Kang | ..................... | C12M 25/14 |

FOREIGN PATENT DOCUMENTS

| | | |
|---|---|---|
| KR | 10-2018-0032597 A | 3/2018 |
| KR | 10-2019-0077407 A | 7/2019 |

(Continued)

OTHER PUBLICATIONS

International Search Report for PCT/KR2023/000152, dated Jun. 7, 2023.

*Primary Examiner* — Yung-Sheng M Tsui
(74) *Attorney, Agent, or Firm* — Sughrue Mion, PLLC

(57) ABSTRACT

The present invention relates to a method for producing an artificial scalp model using a 3D printing-based multi-point multi-nozzles, and an artificial scalp model manufactured by using same, in which a dermal mimetic body can be created by using a plurality of nozzle arrays, a pore mimic structure can be generated, and hair follicle spheroids can then be
(Continued)

created by 3D printing. In the method for producing an artificial scalp model using a 3D printing-based multi-point multi-nozzles and the artificial scalp model manufactured by using same, according to the present invention, by mimicking the hair of a healthy scalp, a plurality of arrayed hair follicle cells can be generated by 3D printing, and by using this, the effect of maximizing the treatment effect of scarring alopecia is obtained.

11 Claims, 16 Drawing Sheets

(51)  Int. Cl.
      *B29C 64/264*       (2017.01)
      *B29L 31/00*        (2006.01)
      *B33Y 10/00*        (2015.01)
      *B33Y 70/00*        (2020.01)
      *B33Y 80/00*        (2015.01)

(52)  U.S. Cl.
      CPC ....... *B29L 2031/7532* (2013.01); *B33Y 10/00* (2014.12); *B33Y 70/00* (2014.12); *B33Y 80/00* (2014.12)

(56)            References Cited

FOREIGN PATENT DOCUMENTS

| KR | 10-2156310 B1 | 9/2020 |
| KR | 10-2021-0052328 A | 5/2021 |
| KR | 10-2021-0143133 A | 11/2021 |

\* cited by examiner

ARTIFICIAL SCALP MODEL PRODUCTION METHOD USING 3D PRINTING-BASED MULTI-POINT MULTI-NOZZLES AND ARTIFICIAL SCALP MODEL CREATED BY USING SAME

CROSS REFERENCE TO RELATED APPLICATIONS

This application is a National Stage of International Application No. PCT/KR2023/000152 filed Jan. 4, 2023, claiming priority based on Korean Patent Application No. 10-2022-0026918 filed Mar. 2, 2022, the entire disclosures of which are incorporated herein by reference.

TECHNICAL FIELD

The research related to the disclosure was conducted with the support of Nano-Materials Technology Development (R&D) (Project title: Development of 3D nano/micro cell printing-based materials and manufacturing technology for multi-scale biomimetic artificial blood vessels and complex muscle tissue, and Project No.: 1711127593) under the supervision of the Ministry of Science and information and communications technology (ICT), and the support of Personal Basic Research (Project title: Development of the next-generation 3D high-speed tissue printing platform for permanent alopecia treatment and hair regrowth, and Project No.: 1711157589) under the supervision of the Ministry of Science and ICT.

The disclosure relates to an artificial scalp model production method using 3D printing-based multi-point multi-nozzles, and an artificial scalp model created by using the same.

BACKGROUND ART

Hair follicles and hair refer to main appendages of a skin, in which important tissues, i.e., nerves and blood vessels of a human body are distributed, and perform various important functions of an integumentary system, such as skin protection, body temperature protection, sebum excretion, and sensory perception.

Hair loss may be clinically divided into cicatricial alopecia, in which hair follicles are destroyed and hair regrow does not occur, and non-scarring alopecia, in which hair follicles are maintained and hair regrowth occurs.

In this regard, conventionally, treatment using compositions for preventing hair loss or promoting hair growth has been widely used. In this connection, Korean patent publication No. 10-2021-0131680 is disclosed.

However, there are no definite treatments for the cicatricial alopecia, in which the hair follicles are destroyed due to external injuries, burns, tumors, infections, etc. and skin tissue becomes fibrotic leading to permanent hair loss, other than surgical hair transplantation. Accordingly, tissue engineering approaches are required for the regrowth and treatment of patients with permanent loss of hair follicles like cicatricial alopecia.

DISCLOSURE

Technical Problem

An aspect of the disclosure is to provide an artificial scalp model production method using 3D printing-based multi-point multi-nozzles, which enables mass production of hair follicles for a conventional surgical hair transplantation to treat cicatricial alopecia, and an artificial scalp model created by using the same.

Technical Solution

According to an embodiment of the disclosure, there may be provided an artificial scalp model production method using 3D printing-based multi-point multi-nozzles, the method including: preparing a first bio-ink containing a dermal fibroblast; forming dermal mimetics having a predetermined volume by using the first bio-ink; preparing a second bio-ink containing hair follicle cells; inserting at least one nozzle into the dermal mimetics to print the second bio-ink; crosslinking the dermal mimetics in the state that the at least one nozzle is inserted in the dermal mimetics; forming at least one spheroid by extruding the second bio-ink through the at least one nozzle; and removing the nozzle by retreating the nozzle so that a space where the nozzle was located in the crosslinked dermal mimetics can serve as a pore mimicking structure.

Meanwhile, the method may further include, before the forming the spheroid, retreating the at least one nozzle a predetermined distance to secure a printing space for the spheroid.

Further, in the crosslinking the dermal mimetics, the pore mimicking structure may retain even after the at least one nozzle is removed from the dermal mimetics.

Meanwhile, the forming the spheroid may be performed by printing a spheroid having a larger diameter than the nozzle in the dermal mimetics.

Meanwhile, the inserting the at least one nozzle into the dermal mimetics may be performed by moving a head, on which the multiple nozzles are arrayed, along an extending direction of the nozzle.

Meanwhile, the forming the spheroid may be performed by simultaneously extruding the second bio-ink from an array of the multiple nozzles at least partially inserted into the dermal mimetics.

Meanwhile, the removing the nozzle may be performed by retreating the nozzle along the extending direction of the nozzle.

Meanwhile, the first bio-ink may contain a component that has photocurable crosslinking properties.

Meanwhile, the crosslinking the dermal mimetics may include irradiating light to crosslink the first bio-ink.

Meanwhile, the first bio-ink may contain a component that has thermosetting crosslinking properties.

Meanwhile, the nozzle may have an outer diameter of 150 to 700 μm.

In addition, there may be provided an artificial scalp model produced by performing preparing a first bio-ink containing a dermal fibroblast; forming dermal mimetics having a predetermined volume by using the first bio-ink; preparing a second bio-ink containing hair follicle cells; inserting at least one nozzle into the dermal mimetics to print the second bio-ink; crosslinking the dermal mimetics in the state that the at least one nozzle is inserted in the dermal mimetics; forming at least one spheroid by extruding the second bio-ink through the at least one nozzle; and removing the nozzle by retreating the nozzle so that a space where the nozzle was located in the crosslinked dermal mimetics can serve as a pore mimicking structure.

Advantageous Effects

With the artificial scalp model production method using the 3D printing-based multi-point multi-nozzles according to the disclosure, and the artificial scalp model created by using the same, a plurality of arrayed hair follicle cells is created by 3D printing, mimicking the hair of a healthy scalp. Therefore, effects on the treatment for cicatricial alopecia is maximized.

MODE FOR INVENTION

Figure 1:
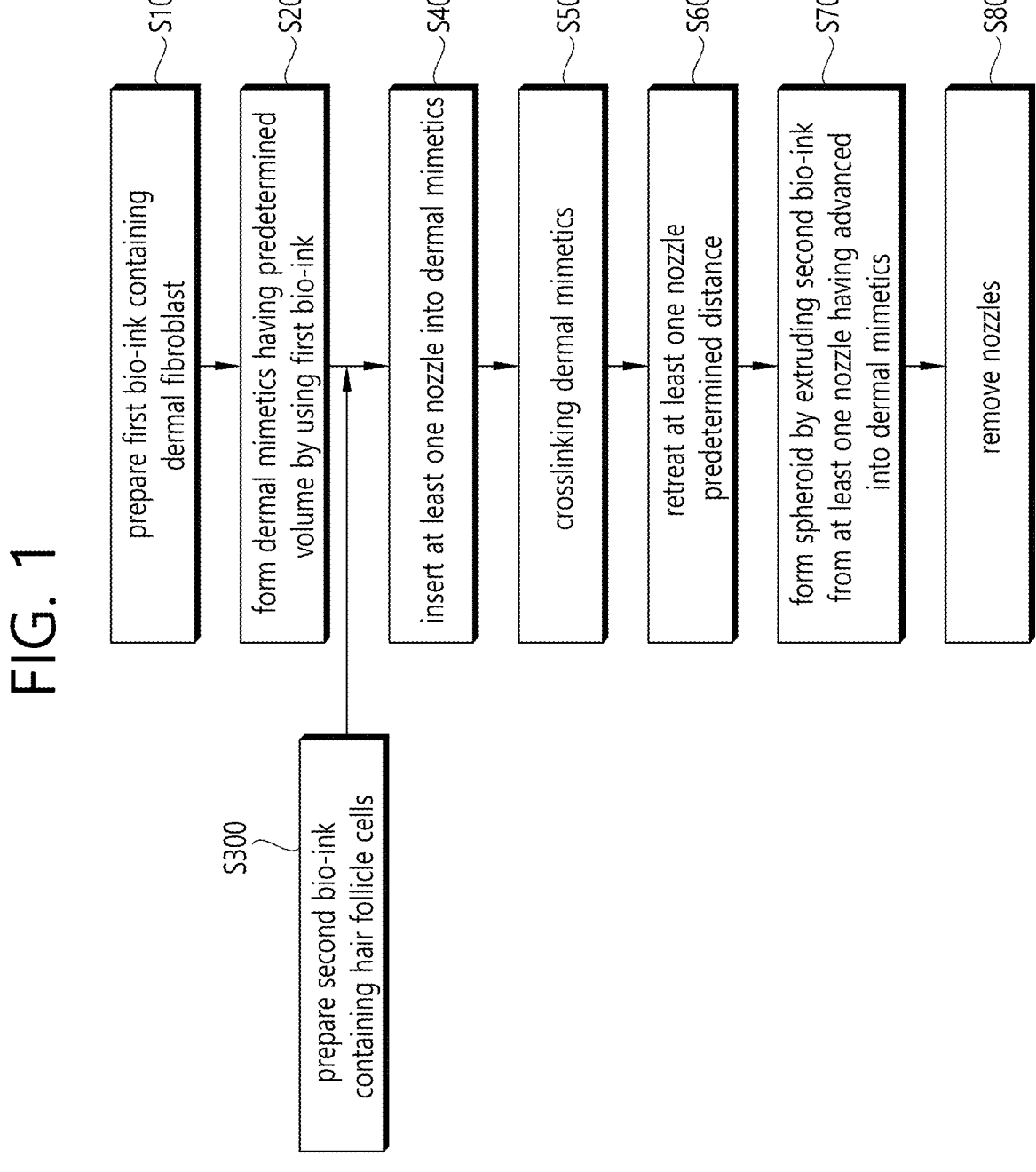
FIG. 1 is a flowchart of an artificial scalp model production method using 3D printing-based multi-point multi-nozzles according to an embodiment of the disclosure.

Below, an artificial scalp model production method using 3D printing-based multi-point multi-nozzles according to an embodiment of the disclosure, and an artificial scalp model created by using the same will be described in detail with reference to the accompanying drawings. In the following description, the terms of components may be referred to as other terms in the art. However, as long as the components have functional similarity and identity therebetween, they may be considered as equivalent components even in alternative embodiments. Further, reference numerals assigned to the components are provided for the convenience of description. However, content indicated by the reference numerals in the drawings do not limit the components to the scope shown in the drawings. Similarly, as long as the configurations in the drawings have functional similarity and identity therebetween, they may be considered as equivalent configurations even in alternative embodiments. Further, descriptions will be omitted for components that should be involved naturally at the level of those skilled in the art.

In the following description, a mass printed in the form of a spheroid by mimicking hair follicles will be referred to as a 'spheroid.'

The number of hair follicles in human scalp is known to be about 80 to 100 per unit area (cm2). The hair follicle has a structure that not a sparse collection of single cells but hundreds of hair follicle cells (dermal papilla cells) are closely aggregated to form a follicle.

Meanwhile, technologies of using bio-ink to mimic human tissue are being currently developed in various ways. However, the existing bioprinting technologies, in which cells are simply included in the bio-ink and discharged through a single nozzle, have limitations on production time and reproducibility when applied to a histological structure having the form of the follicle with the cells closely aggregated like the hair follicle.

According to the disclosure, a scalp model at a tissue level is produced to simultaneously print a plurality of foregoing hair follicle tissues at once.

Below, the artificial scalp model production method using the 3D printing-based multi-point multi-nozzles according to an embodiment of the disclosure will be described with reference to FIG. 1.

FIG. 1 is a flowchart of the artificial scalp model production method using the 3D printing-based multi-point multi-nozzles according to an embodiment of the disclosure.

Referring to FIG. 1, the artificial scalp model production method using the 3D printing-based multi-point multi-nozzles according to the disclosure may include the steps of preparing a first bio-ink containing a dermal fibroblast (S100), forming dermal mimetics having a predetermined volume by using the first bio-ink (S200), preparing a second bio-ink containing hair follicle cells (S300), advancing at least one nozzle into the dermal mimetics (S400), crosslinking the dermal mimetics (S500), retreating at least one nozzle a predetermined distance (S600), forming a spheroid by extruding the second bio-ink from at least one nozzle having advanced into the dermal mimetics (S700), and removing the nozzle (S800).

The step S100 of preparing the first bio-ink containing the dermal fibroblast corresponds to a step of preparing the bio-ink for mimicking and printing scalp. In this step S100, the first bio-ink may contain the dermal fibroblast, and a material having crosslinking properties under a predetermined condition. For example, the first bio-ink may contain a photocurable and/or thermosetting material.

The photocurable material contained in the first bio-ink may for example include commercially available Irgacure, LAB, and Ru/SPS (ruthenium/sodium persulfate). Further, the first bio-ink may contain a material that to be crosslinked using a photoinitiator.

Meanwhile, the thermosetting material may for example include a collagen-based ECM (extracellular matrix). In this case, the ECM may be prepared through a decellularization process of removing deoxyribonucleic acid (DNA) of cells from mammalian skin or scalp tissue.

For example, when the first bio-ink contains Ru (Ruthenium), SPS (Sodium persulfate) to be crosslinked by visible light, the concentration of Ru/SPS may be 0.25/2.5 mM. In this case, the first bio-ink may be irradiated with the visible light to gel while containing the dermal fibroblast. Here, the photocurable material may maintain gelation properties through the crosslinking and at the same time ensure the viability of the dermal fibroblast. The concentration of the photocurable material and the viability of the cells in the first bio-ink will be described later with reference to FIGS. 6 and 7.

The step S200 of forming the dermal mimetics having a predetermined volume by using the first bio-ink corresponds to a step of forming the dermal mimetics (bath suspension) having a predetermined thickness and a predetermined area. In this step S200, the dermal mimetics may be formed to have a thickness appropriate for printing the hair follicle cell. For example, the dermal mimetics may be formed to have a thickness of 1 to 300 mm. Meanwhile, the area of the dermal mimetics may be determined according to nozzle arrays of a 3D printer (to be described later). In other words, the area of the dermal mimetics may be determined to be larger than the area on the plane where an array of multiple nozzles is placed. Therefore, the dermal mimetics can accommodate the spheroids that are created by simultaneous extrusion while the array of multiple nozzles provided in a head of the 3D printer are all inserted in the dermal mimetics.

The step S300 of preparing the second bio-ink containing the hair follicle cells corresponds to a step of preparing a material for mimicking an aggregate of hair follicle cells. The prepared second bio-ink may contain a high concentration ($1\times10$ cells/mL or higher) of hair follicle cells as if actual hair follicle cells are aggregated in the form of a follicle.

The step S400 of advancing at least one nozzle into the dermal mimetics corresponds to a step of simultaneously inserting at least one nozzle provided in the head of the 3D printer into the previously formed dermal mimetics. In this case, at least one nozzle refers to a tip through which the foregoing second bio-ink is extruded from the end thereof to perform 3D printing. In this step, when the nozzle advances into the dermal mimetics, the structure of a pore may be formed by the nozzle. For example, the head of the 3D printer moves in a direction perpendicular to the direction in which a dermal structure is formed, i.e., in the thickness direction of the dermal mimetics so that the nozzles can be inserted in the dermal mimetics. In this case, a moving distance of the head of the 3D printer may be determined such that the end of the nozzle can be located inside the dermal mimetics.

The step S500 of crosslinking the dermal mimetics corresponds to a step of crosslinking the dermal mimetics by irradiating light, e.g., ultraviolet or visible light thereto. In this case, the dermal mimetics may be crosslinked with at least one nozzle inserted therein. In addition, exposure time to the ultraviolet or visible light may vary depending on the concentration of the photocurable material. For example, when Ru is added to the first bio-ink at a concentration corresponding to 10% of SPS, the dermal mimetics may gel within 3 minutes as exposed to visible light. Therefore, a space occupied by the nozzle in the dermal mimetics may be maintained empty when the nozzle is removed later. Such an empty space mimics the structure of the pore. Meanwhile, although not shown, when the first bio-ink contains the thermosetting material, the dermal mimetics may be crosslinked in this step by applying heat thereto.

The step S600 of retreating at least one nozzle a predetermined distance corresponds to a step of retreating at least one nozzle a predetermined distance to secure a space for the 3D printing while mimicking the aggregate of hair follicle cells. In this step, the head of the 3D printer is moved in a direction opposite to the insertion direction of the nozzle, so that at least one nozzle can be retreated at once. For example, the retreating distance may be based on the aggregate size of the hair follicle cell. In this case, the head of the 3D printer may be retreated by 200 to 1000 µm.

The step S700 of forming the spheroid by extruding second bio-ink from at least one nozzle having advanced into the dermal mimetics corresponds to a step of forming at least one spheroid by controlling an extrusion pressure and an extrusion time for the second bio-ink. When multiple nozzles are provided, a plurality of spheroids may be simultaneously printed to have the same size in three dimensions (3D). Meanwhile, the extrusion pressure and the extrusion time in this case may be determined in connection with the outer diameter of the nozzle. In this case, the extrusion time may be 100 to 800 ms for a quick extrusion.

The step S800 of removing the nozzle corresponds to a step of removing the nozzle from the dermal mimetics by retreating the 3D printer. When this step is completed, the pore structures may be formed in the dermal mimetics, and the spheroid mimicking the aggregate of the hair follicle cells may be formed at the deepest point of each pore structure. In this case, when a plurality of arrays of nozzles is provided in the head of the 3D printer, the plurality of arrays of pores and spheroids may be simultaneously formed.

By the artificial scalp model production method using the 3D printing-based multi-point multi-nozzles according to the foregoing embodiment of the disclosure, a dermal layer including pores of 150 to 700 µm, in which hair can grow, and dozens of hair follicle cell aggregates may be printed at once. Further, because it is possible to simultaneously form a plurality of hair follicle spheroids using the multiple nozzles, the spheroids may be printed to have substantially the same size.

Below, a process of creating an artificial scalp model will be described with reference to FIGS. 2 to 5, based on the steps performed in the foregoing artificial scalp model production method using the 3D printing-based multi-point multi-nozzles.

Figure 2:
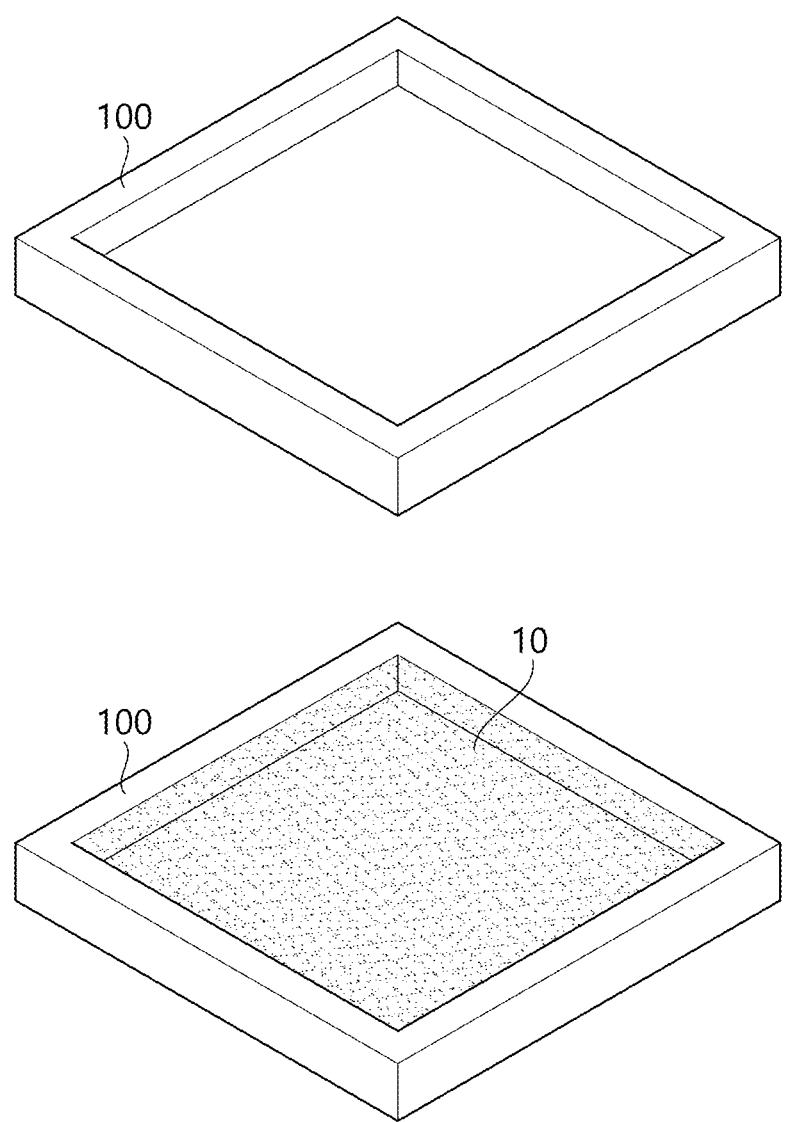
FIG. 2 is a conceptual view of forming dermal mimetics.

FIG. 2 is a conceptual view of forming dermal mimetics 10. As shown therein, the dermal mimetics 10 may be formed by printing the first bio-ink in a certain mold 100. The first bio-ink may be ready according to the sizes of the artificial scalp model to be created, and may also be printed to have a determined thickness.

FIGS. 3a, 3b, 3c, 3d, 3e and 3f are concept views of creating a scalp model in order of the artificial scalp model production method using 3D printing-based multi-point multi-nozzles 210.

Figure 3A:
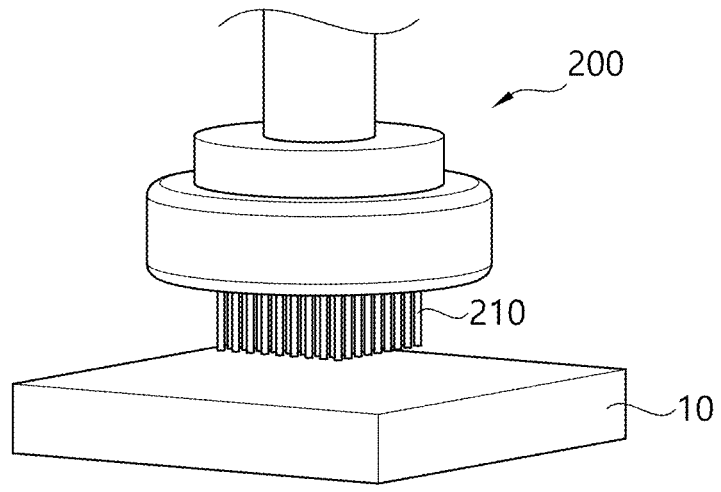
FIGS. 3*a*, 3*b*, 3*c*, 3*d*, 3*e* and 3*f* are concept views of creating a scalp model in order of an artificial scalp model production method using 3D printing-based multi-point multi-nozzles.

Referring to FIG. 3a, the dermal mimetics 10 formed as shown in FIG. 2 are placed under the 3D printer. In this case, the 3D printer may be loaded with the second bio-ink. In a head 200 of the 3D printer, multiple nozzles are arrayed in a horizontal direction.

Figure 3B:
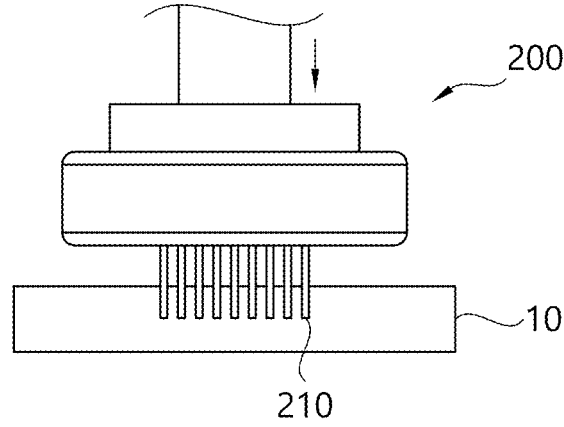

Referring to FIG. 3b, the position to which the head 200 of the 3D printer moves down may be adjusted to insert the nozzles 210 of the 3D printer into the dermal mimetics 10 so that the ends of the nozzles 210 can be placed inside the dermal mimetics 10. In this case, the array of multiple nozzles 210 may be simultaneously located at the same depth within the dermal mimetics 10.

Figure 3C:
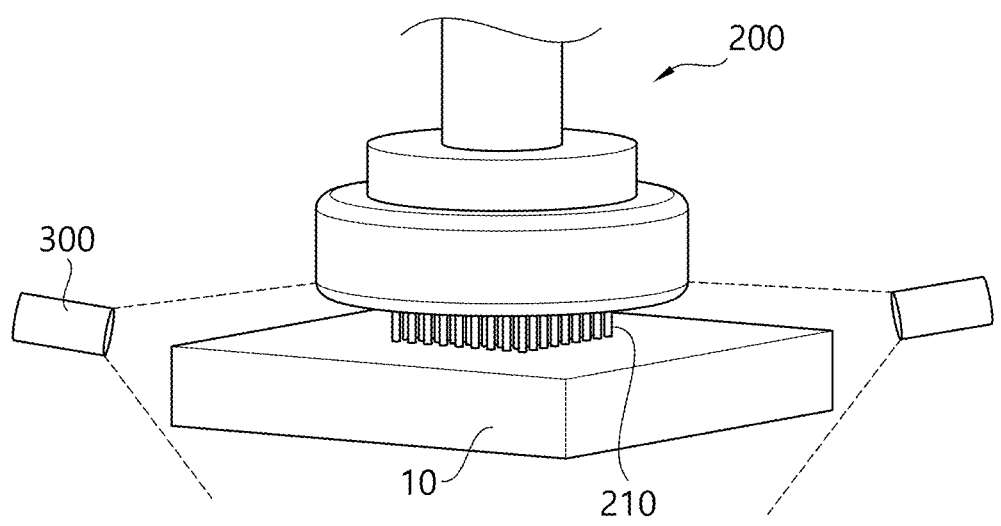

Referring to FIG. 3c, the dermal mimetics 10 may be crosslinked while the head 200 of the 3D printer is inserted into the dermal mimetics 10. In this case, the dermal mimetics 10 may be crosslinked by light, e.g., ultraviolet or visible light emitted from light emitters 300.

Figure 3D:
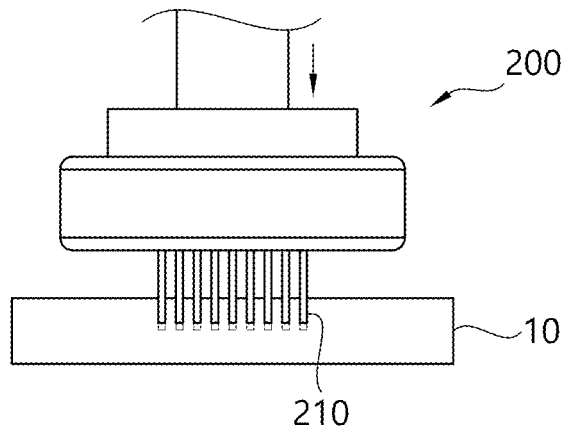

Then, referring to FIG. 3d, the head 200 of the 3D printer may move up a predetermined distance to provide a printing space for the spheroid.

Figure 3E:
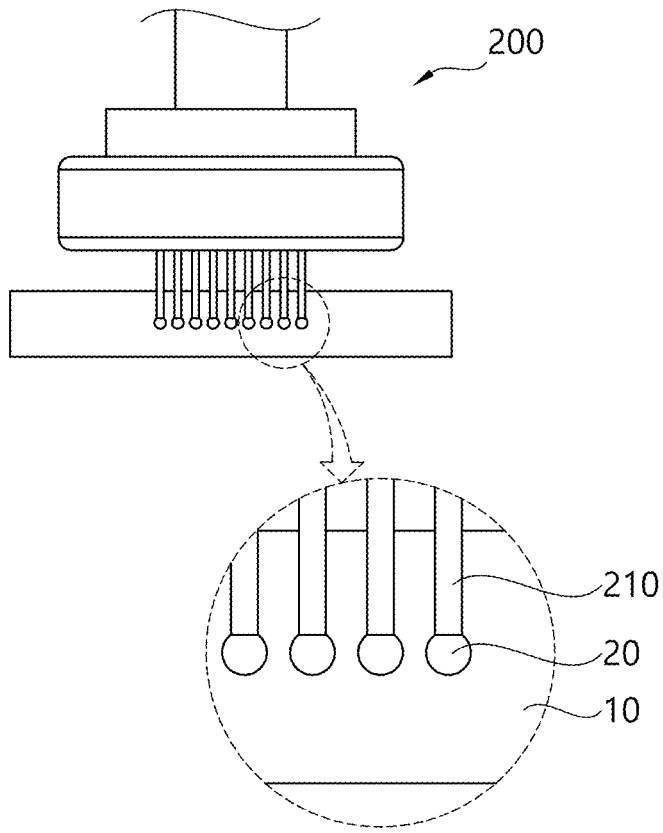

Referring to FIG. 3e, the 3d printer may extrude the second bio-ink from the nozzles 210 at a predetermined pressure for a predetermined period of time. The extruded second bio-ink forms the spheroids in the spaces on the end side of the nozzles 210. In this case, the plurality of spheroids may be simultaneously formed as the second bio-ink is extruded from the array of multiple nozzles 210 simultaneously.

Figure 3F:
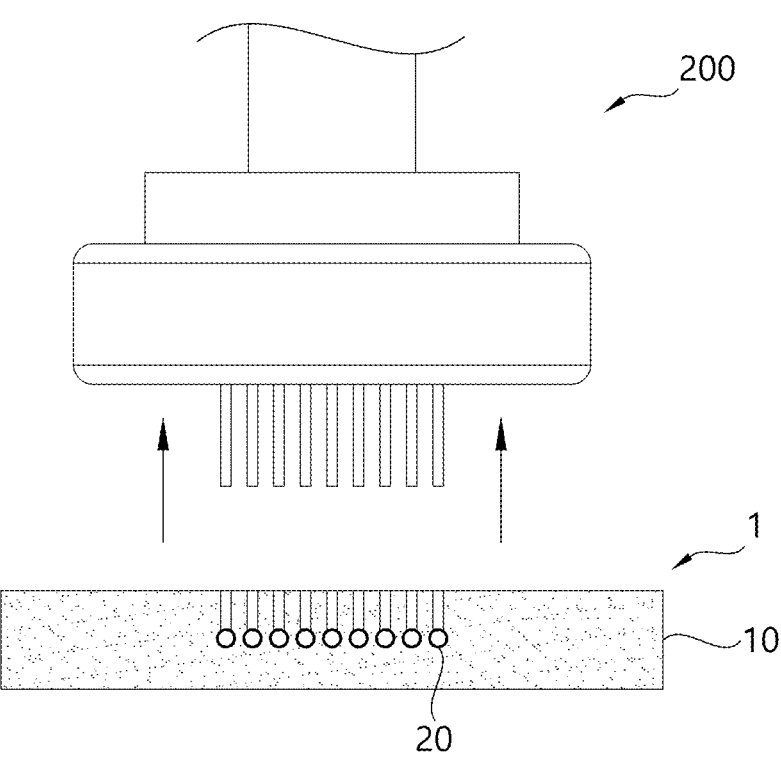

Referring to FIG. 3f, the nozzles 210 may be removed at once after the 3D printing is completed. In this case, the head 200 of the 3D printer is moved up to remove the nozzles 210, thereby minimizing the deformation of the dermal mimetics during this removal process.

Figure 4A:
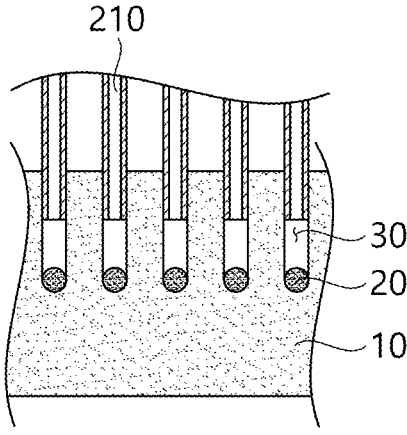
FIGS. 4*a* and 4*b* are cross-sectional views of the scalp model formed by removing the nozzles in FIG. 3*f.*
Figure 4B:
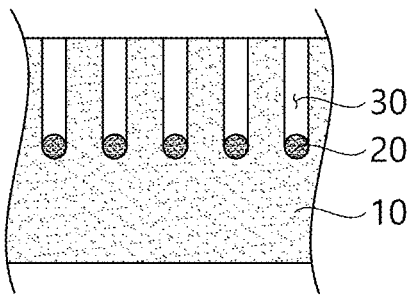

FIGS. 4a and 4b are cross-sectional views of the scalp model formed by removing the nozzles 210 in FIG. 3f.

Referring to FIG. 4a, the plurality of nozzles 210 may be removed as retreated after respectively forming the spheroids inside the crosslinked dermal mimetics. Meanwhile, in this case, the nozzle 210 may be configured regardless of the diameter of the spheroid. In other words, the diameter of the formed spheroid may be larger than or smaller than the diameter of the nozzle 210. In this case, spaces 30 where the nozzles were located are retained in the crosslinked dermal mimetics 10 even though the nozzles 210 are retreated.

Referring to FIG. 4b, the spaces where the nozzles 210 were placed are retained in the dermal mimetics 10 in the state that the nozzles 210 are removed. Such spaces can serve as a pore mimicking structure 30.

Ultimately, a plurality of pore structures is arrayed in the dermal mimetics 10, and hair follicle spheroids 20 are simultaneously and respectively printed on the pore structures, thereby creating an artificial scalp model. In the artificial scalp model created according to this embodiment, many pores and hair follicle structures are simultaneously formed by the 3D printing.

Below, the characteristics of the artificial scalp model created according to the disclosure will be described with reference to FIGS. 5 to 10.

Figure 5:
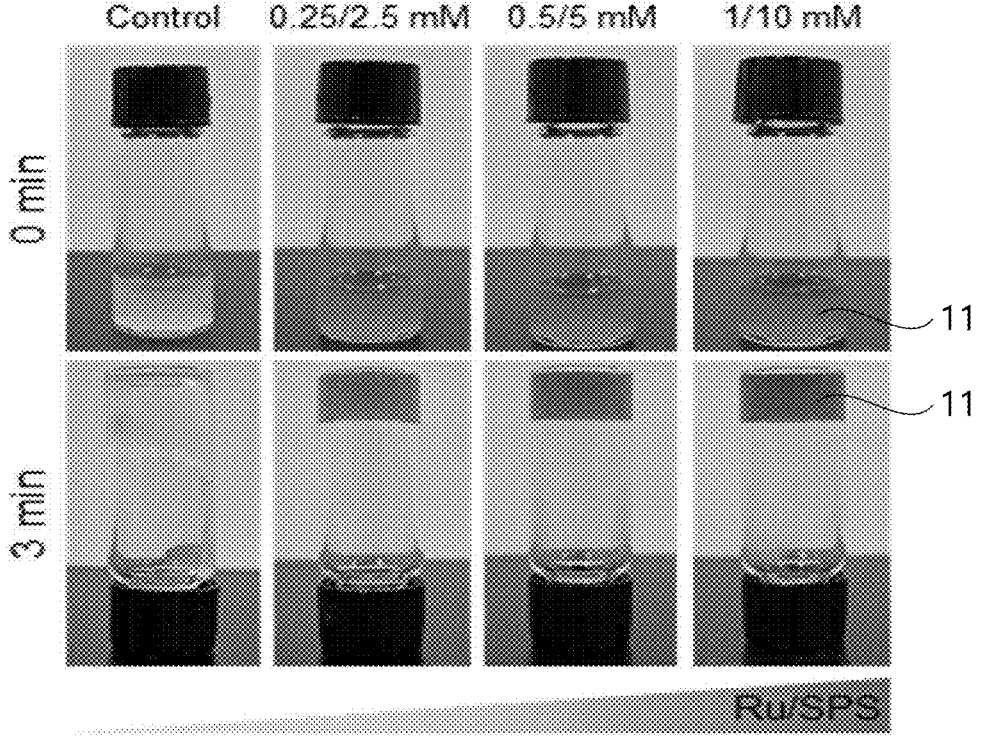
FIG. 5 shows gelation test results according to ruthenium/sodium persulfate concentrations of a first bio-ink.

FIG. 5 shows gelation test results according to ruthenium/sodium persulfate concentrations of a first bio-ink.

Referring to FIG. 5, appropriate concentrations for the printing and crosslinking characteristics to form the dermal mimetics are shown. When ratios of Ru/SPS contained in the first bio-ink 11 were 0.25/2.5 mM, 0.5/5 mM, and 1/10 mM for the photocurable characteristics, the dermal mimetics were crosslinked within 3 minutes after irradiation with visible light. Therefore, in relation to the hardness of the dermal mimetics, a preferable concentration of Ru/SPS may be 10%.

Figure 6:
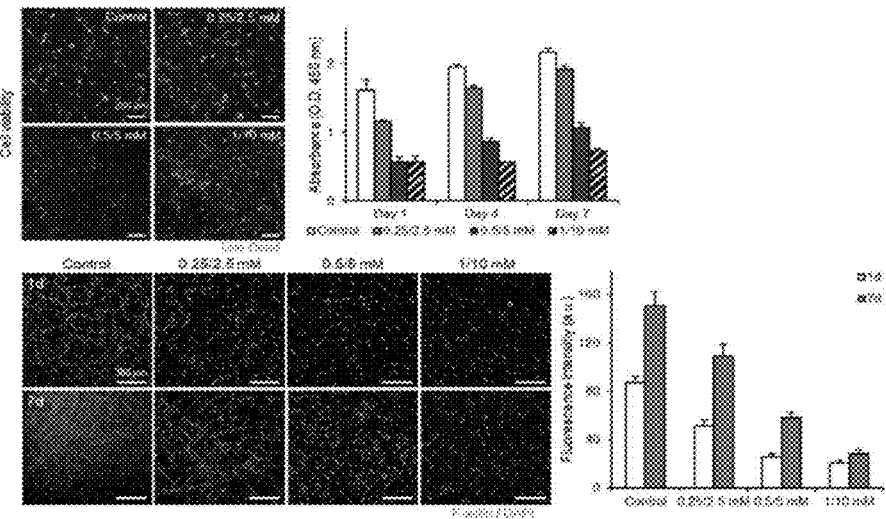
FIG. 6 shows cell function evaluation results according to ruthenium/sodium persulfate concentrations of a first bio-ink.

FIG. 6 shows cell function evaluation results according to ruthenium/sodium persulfate concentrations of the first bio-ink. Referring to FIG. 6, an optimal concentration may be determined by encapsulating dermal fibroblasts at different Ru/SPS concentrations and then evaluating the viability and proliferative potential of cells.

Referring to the top left in FIG. 6, as a result of live/dead staining tests for checking the encapsulated dermal fibroblasts, a large number of dead cells were observed when the concentration of Ru/SPS was above 0.5/5 mM.

Referring to the top right in FIG. 6, in the proliferation evaluation using the CCK-8 assay, the experimental groups of 5/0.5 mM and 1/10 mM showed little proliferation during 7 days of in vitro culture.

Referring to the bottom left in FIG. 6, as results of F-actin staining, cells in the experimental group of 0.25/2.5 mM like the control were observed to be well engrafted and stretched within a hydrogel after 7 days, whereas cells in the experimental groups of other concentrations were not stretched within the hydrogel and still retained the phenotype of when encapsulated.

Referring to the bottom right in FIG. 6, as results of evaluating the fluorescence intensity of the F-actin for quantitative evaluation, the group of 0.25/2.5 mM showed excellent cell biocompatibility compared to other groups.

Ultimately, as described above with reference to FIGS. 5 and 6, when the first bio-ink is determined to have an Ru/SPS concentration of 0.25/2.5 mM, appropriate strength is secured when crosslinked by light, and the viability and proliferation of the encapsulated dermal fibroblasts are ensured.

Figure 7:
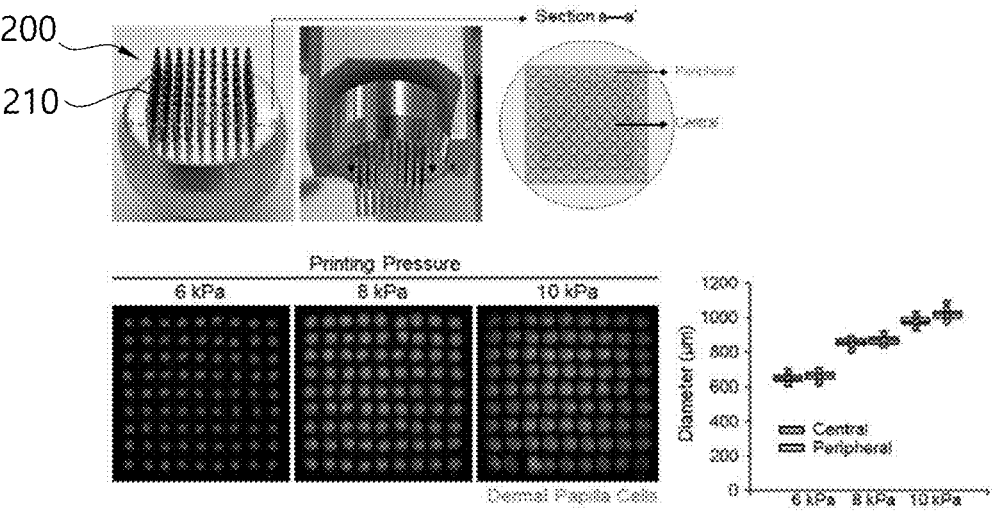
FIG. 7 shows comparison between printing results of spheroids according to operation pressures for printing a second bio-ink.

FIG. 7 shows comparison between printing results of spheroids according to operation pressures for printing a second bio-ink.

Referring to FIG. 7, the optimized nozzle diameter and extrusion pressure and time of the 3D printer will be understood. In this case, as described above, the dermal mimetics with the determined Ru/SPS concentration of 0.25/2.5 mM were tested to optimize the nozzle diameter and extrusion conditions.

Referring to the top in FIG. 7, an array of 9×9, i.e., a total of 81 nozzles 210 may be provided on the head 200 of the 3D printer, and it is possible to change the extrusion pressure for the second bio-ink from each nozzle 210. Referring to the bottom of FIG. 7, the extrusion pressures of 6 kPa, 8 kPa, and 10 kPa were selected, and the sizes of the spheroids were uniformly varied depending on the extrusion pressure, regardless of the positions of the nozzles on the array.

Figure 8:
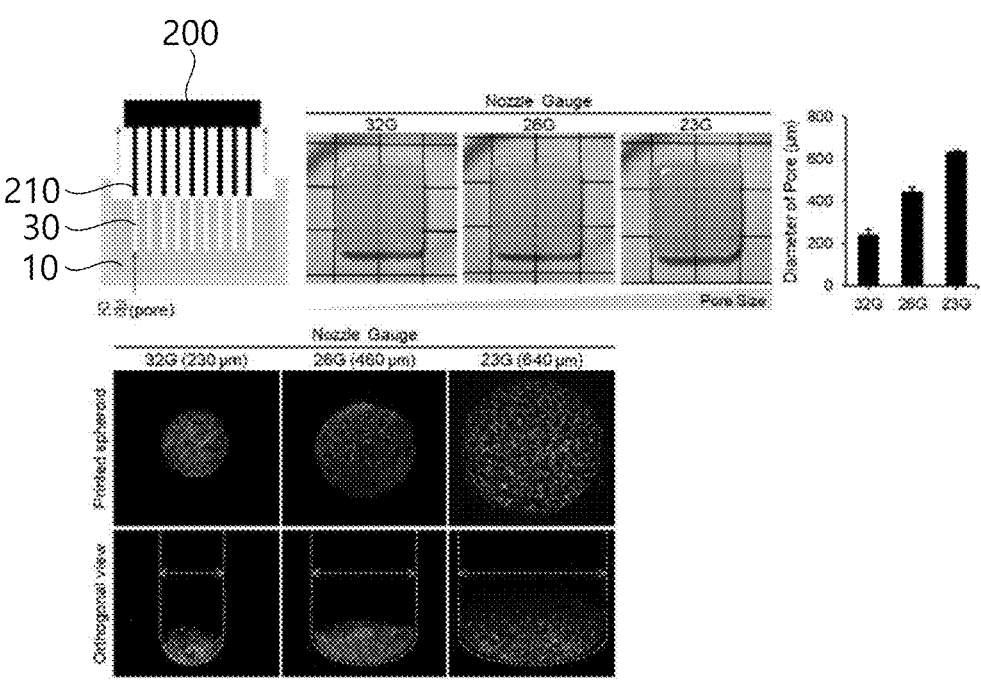
FIG. 8 shows spheroids and pore sizes formed according to the diameters of nozzles.

FIG. 8 shows spheroids and pore sizes formed according to the diameters of nozzles.

Referring to the top left and top center in FIG. 8, the pores may be formed differently according to the size of the nozzle 210 provided in the head 200 of the 3D printer. The pore mimicking structure formed by inserting the arrays different in the diameter of the nozzle 210 (e.g., 32, 26, and 23 gauges) into the dermal mimetics 10 and then crosslinking the dermal mimetics 10 were evaluated. After inserting the needle arrays having various outer diameters into the dermal mimetics containing 0.25/2.5 mM Ru/SPS described with reference to FIG. 6, the dermal mimetics were photocured by exposure to visible light for 3 minutes. As a result, the consistent pores were formed according to the size of the nozzle (see the top right). For example, when the spheroid is printed using the 32-gauge nozzle (having an outer diameter of 235 μm), the pore of about 230 μm may be formed in the dermal mimetics.

Referring to the bottom of FIG. 8, the spheroids were printed by the extrusion from the multiple nozzles into the pore mimicking structures formed in the dermal mimetics and having different inner diameters, and the sizes of the spheroids were ultimately varied depending on the inner diameter of the pore-mimetic structure.

Figure 9:
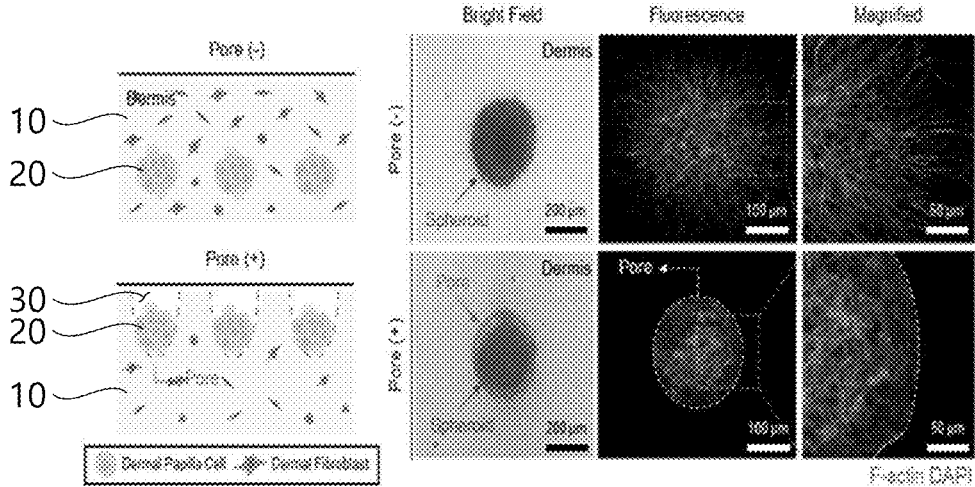
FIG. 9 shows spheroid culturing results according to the presence or absence of pores.

FIG. 9 shows spheroid culturing results according to the presence or absence of the pores.

Referring to the top image in FIG. 9, when the hair follicle spheroid was formed in a dermal layer without pores, it was observed that the cells escaped from the spheroid 20 while spreading into the dermal mimetics 10 after 3 days from the culture. On the other hand, referring to the bottom image in FIG. 9, when the spheroid 20 was formed in the pore-mimetic structure 30, it was observed that the spheroid 20 maintains a spherical shape in the pore mimicking structure 30 without spreading into the dermal mimetics 10 even though the spheroid 20 is cultured. Ultimately, it will be appreciated that the structure of the pore 30 is essentially required to culture the hair follicle cell appropriately.

Figure 10:
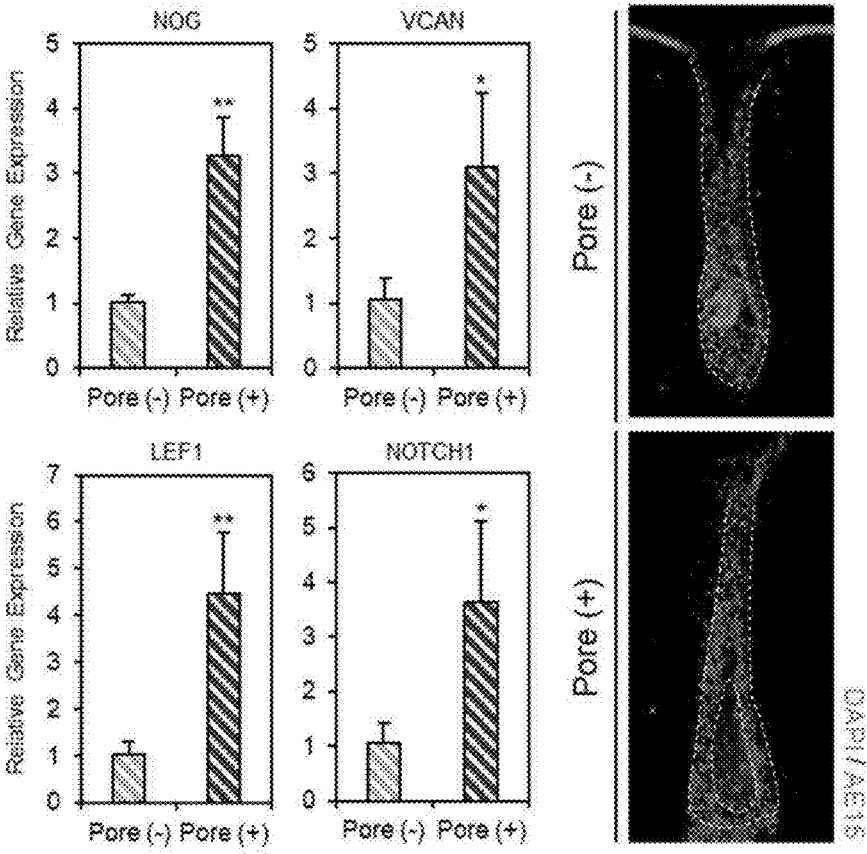
FIG. 10 shows gene analysis and immunostaining results according to the presence or absence of pores.

FIG. 10 shows gene analysis and immunostaining results according to the presence or absence of pores.

It is well-known that the shape maintenance of the cell spheroid has a significant effect on the differentiation and function of cells. The left in FIG. 10 showed the results of analysis based on rt-PCR using the representative genetic markers generated when the hair follicle cells differentiate to form hair, depending on the presence or absence of the pore mimicking structure. As a result, all the markers have significantly higher gene expression values in the case of the presence of pores than in the case of the absence of the pores. Further, referring to the right in FIG. 10, as results of performing the immunostaining using one of the early markers for hair formation, i.e., an AE15 antibody, AE15 was expressed and differentiated into hair in the hair follicle spheroid in the case of the presence of the pores (see the bottom in FIG. 10(*b*)).

As described above, by the artificial scalp model production method using 3D printing-based multi-point multi-nozzles according to the disclosure and the artificial scalp model created using the same, the array of many pores and hair follicle spheroids are formed simultaneously, thereby maximizing effects on treatment for cicatricial alopecia.

The invention claimed is:

1. An artificial scalp model production method using 3D printing-based multi-point multi-nozzles, the method comprising:

preparing a first bio-ink containing a dermal fibroblast;

forming dermal mimetics having a predetermined volume by using the first bio-ink;

preparing a second bio-ink containing hair follicle cells;

inserting at least one nozzle into the dermal mimetics to print the second bio-ink;

crosslinking the dermal mimetics in the state that the at least one nozzle is inserted in the dermal mimetics;

forming at least one spheroid by extruding the second bio-ink through the at least one nozzle; and removing the nozzle by retreating the nozzle so that a space where the nozzle was located in the crosslinked dermal mimetics can serve as a pore mimicking structure.

2. The method of claim 1, further comprising, before the forming the spheroid, retreating the at least one nozzle a predetermined distance to secure a printing space for the spheroid.

3. The method of claim 2, wherein, in the crosslinking the dermal mimetics, the pore mimicking structure retains even after the at least one nozzle is removed from the dermal mimetics.

4. The method of claim 2, wherein the forming the spheroid comprises extruding the second bio-ink to a lower end of the pore mimicking structure.

5. The method of claim 4, wherein the advancing the at least one nozzle into the dermal mimetics is performed by moving a head, on which the multiple nozzles are arrayed, along an extending direction of the nozzle.

6. The method of claim 5, wherein the forming the spheroid is performed by simultaneously extruding the second bio-ink from an array of the multiple nozzles at least partially inserted into the dermal mimetics.

7. The method of claim 6, wherein the removing the nozzle is performed by retreating the nozzle along the extending direction of the nozzle.

8. The method of claim 2, wherein the first bio-ink contains a component that has photocurable crosslinking properties.

9. The method of claim 8, wherein the crosslinking the dermal mimetics comprises irradiating light to crosslink the first bio-ink.

10. The method of claim 2, wherein the first bio-ink contains a component that has thermosetting crosslinking properties.

11. The method of claim 3, wherein the nozzle has an outer diameter of 150 to 700 μm.

* * * * *